US 8,397,027 B2

(12) United States Patent
Sivakumar et al.

(10) Patent No.: US 8,397,027 B2
(45) Date of Patent: Mar. 12, 2013

(54) METHODS AND SYSTEMS FOR MULTI-CACHING

(75) Inventors: Raghupathy Sivakumar, Alpharetta, GA (US); Aravind Velayutham, Atlanta, GA (US); Zhenyun Zhuang, Atlanta, GA (US)

(73) Assignee: EMC Corporation, Hopkinton, MA (US)

( * ) Notice: Subject to any disclaimer, the term of this patent is extended or adjusted under 35 U.S.C. 154(b) by 1157 days.

(21) Appl. No.: 12/228,171

(22) Filed: Aug. 11, 2008

(65) Prior Publication Data

US 2009/0049237 A1 Feb. 19, 2009

Related U.S. Application Data

(60) Provisional application No. 60/955,177, filed on Aug. 10, 2007.

(51) Int. Cl.
*G06F 12/08* (2006.01)
(52) U.S. Cl. ........ 711/133; 711/207; 711/203; 711/147; 711/156; 711/E12.019
(58) Field of Classification Search .......... 711/118, 711/147, 156, 207, 203, 133, E12.019; 707/999.01, 707/E17.032
See application file for complete search history.

(56) References Cited

U.S. PATENT DOCUMENTS

| 5,907,678 | A | * | 5/1999 | Housel et al. ............... 709/213 |
|---|---|---|---|---|
| 5,937,431 | A | | 8/1999 | Kong et al. |
| 6,047,356 | A | | 4/2000 | Anderson et al. |
| 6,108,708 | A | * | 8/2000 | Iwata ............... 709/238 |
| 6,128,654 | A | | 10/2000 | Runaldue et al. |
| 6,457,053 | B1 | * | 9/2002 | Satagopan et al. ........... 709/226 |
| 7,870,380 | B2 | * | 1/2011 | VanHeyningen et al. ..... 713/151 |
| 2006/0031230 | A1 | * | 2/2006 | Kumar ...................... 707/10 |
| 2006/0184652 | A1 | | 8/2006 | Teodosiu et al. |
| 2007/0100994 | A1 | | 5/2007 | Armstrong et al. |
| 2008/0104390 | A1 | * | 5/2008 | VanHeyningen et al. ..... 713/151 |
| 2009/0063187 | A1 | * | 3/2009 | Johnson et al. ............... 705/2 |

OTHER PUBLICATIONS

International Search Report and Written Opinion for International Application No. PCT/US08/009583, issued by the International Searching Authority, dated Nov. 18, 2008.

* cited by examiner

*Primary Examiner* — Pierre-Michel Bataille
(74) *Attorney, Agent, or Firm* — Ballard Spahr LLP

(57) ABSTRACT

Provided are methods and systems for multi-caching. The methods and systems provided can enhance network content delivery performance in terms of reduced response time and increased throughput, and can reduce communication overhead by decreasing the amount of data that have to be transmitted over the communication paths.

17 Claims, 22 Drawing Sheets

METHODS AND SYSTEMS FOR MULTI-CACHING

CROSS REFERENCE TO RELATED PATENT APPLICATIONS

This application claims priority to U.S. Provisional Application No. 60/955,177 filed Aug. 10, 2007, herein incorporated by reference in its entirety.

SUMMARY

Provided are methods and systems for multi-caching. The methods and systems provided can enhance network content delivery performance in terms of reduced response time and increased throughput, and can reduce communication overhead by decreasing the amount of data that have to be transmitted over the communication paths.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
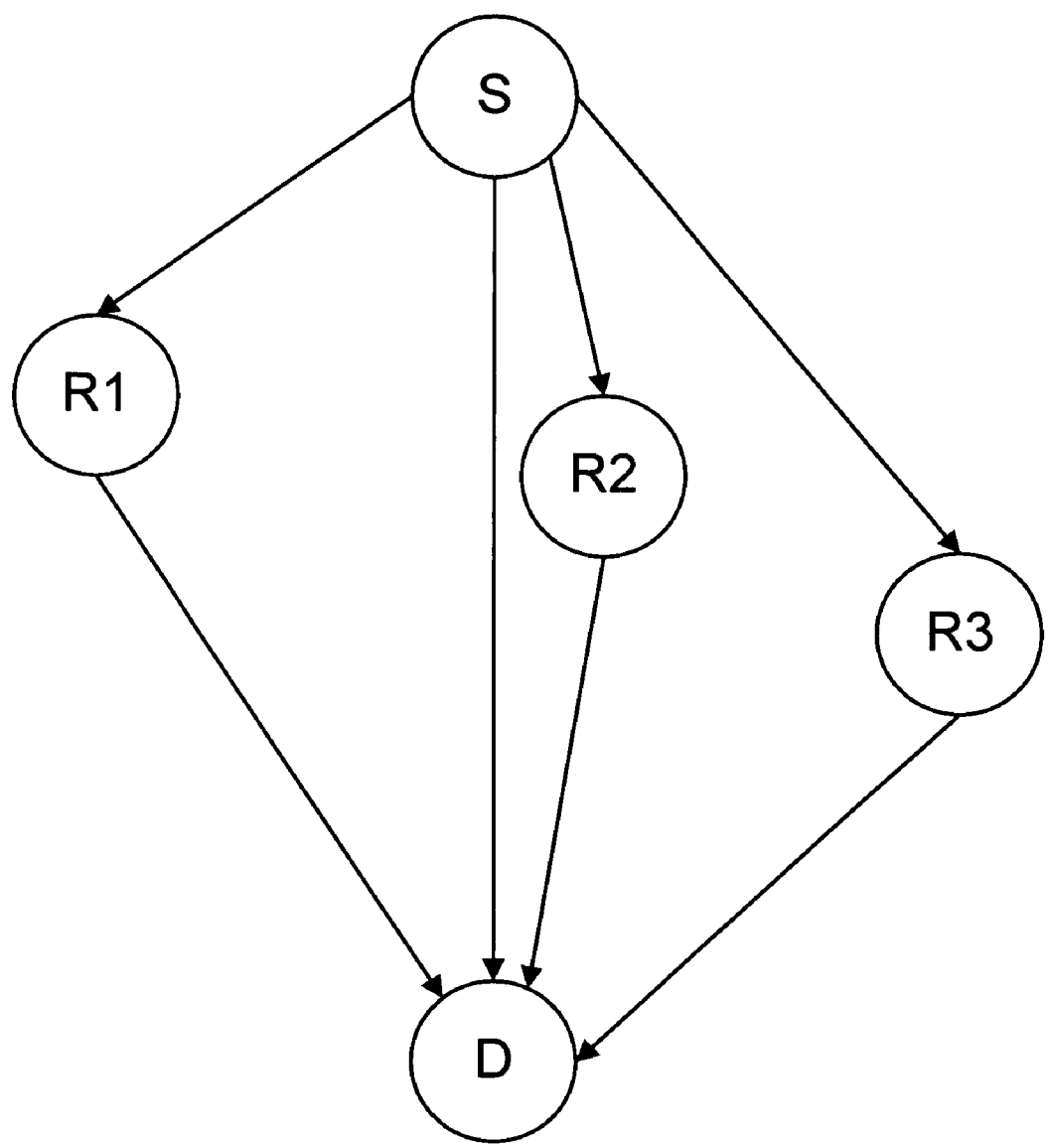
FIG. 1 is an exemplary operating environment.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Provided are methods and systems for multi-caching. The methods and systems provided can enhance network content delivery performance in terms of reduced response time and increased throughput, and can reduce communication overhead by decreasing the amount of data that have to be transmitted over the communication paths. An exemplary scenario can be a user accessing a web site. The requested data thus are delivered from the web site to the user along a certain path. The data destination where the user resides can be denoted by D (Data destination). In an aspect, multi-caching can be implemented on a proxy device denoted by S (also referred to herein as a GigaNode, or GN) located immediately before the content sender (or server) and end-user computers. In another aspect, multi-caching can be implemented directly on the content sender or server or the access router at the one end and at other consumer devices such as set-top boxes, home routers, etc at the other end.

In an exemplary single-path environment, if D already has the data to be sent S can send to D a reference, or index also referred to as a unique identifier, to the data rather than the original full data packet, and D can recover the packet. When a Multi-Path technology is used (for example, as described in U.S. patent application Ser. No. 11/063,284, herein incorporated by reference for its teachings regarding multi-path routing), depending on the situation, there can be one or more reflector nodes (denoted by R, also referred to as SoftNodes) as shown in FIG. 1. Thus, while some portions of the data flow through the direct path (S→D), some portions of data in the multi-path network flow along the path (S→R→D). For the direct path, as before, if D already has the data being delivered, then the data itself does not have to be sent again from S to D. Instead, S only needs to send to D a reference or index rather than the original full packet, and D can recover the packet. Similarly, the indirect path of S→R→D can also be optimized. The indirect path consists of two path segments, namely S→R and R→D. If R already has the data being delivered, then the data size delivered on the first path segment can be reduced considerably. If S notifies R about what data S is about to send, then R can send the data to D on behalf of S even without receiving the actual packet from S.

Unlike other conventional and well-known caching technologies, multi-caching overcomes the challenges associated with targeted application scenarios. In an aspect, multi-caching properties can comprise one or more of, an intelligent hashing mechanism, an adaptive cache replacement, and a cache-aware packets synchronization strategy. Multi-caching can maintain cache state consistency between communicating peers. When data packets are being sent to the correspondent, if identical packets were sent before and thus their corresponding cache entities exist in local cache, their hashing values rather than the data themselves can be sent. On the correspondent side, the original packets can be recovered and delivered to end-users. Since the hashing values (e.g. 16 bytes with MD5 hashing) are much smaller than the data packets (e.g. up to 1500 bytes in the case of Ethernet), the data delivery is much more lightweight with multi-caching, and thus the performance experienced by end users can be considerably improved.

Figure 2:
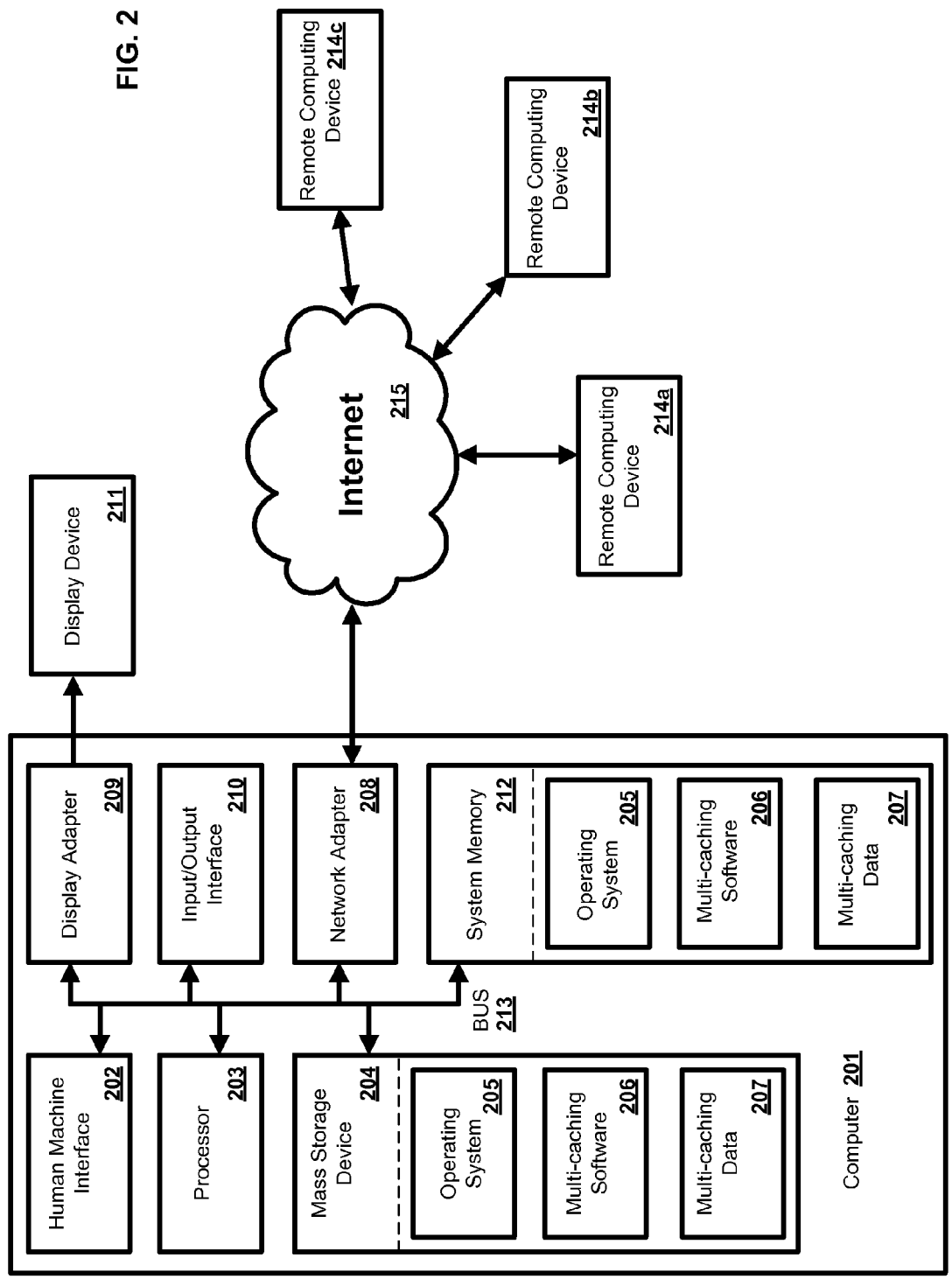
FIG. 2 is another exemplary operating environment.

FIG. 2 is a block diagram illustrating an exemplary operating environment for performing the disclosed methods and portions thereof. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, multi-caching software 206, multi-caching data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as multi-caching data 207 and/or program modules such as operating system 205 and multi-caching software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and multi-caching software 206. Each of the operating system 205 and multi-caching software 206 (or some combination thereof) can comprise elements of the programming and the multi-caching software 206. Multi-caching data 207 can also be stored on the mass storage device 204. Multi-caching data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like.

The computer 201 can operate in a networked environment using logical connections to one or more remote computing devices 214a,b,c. By way of example, a remote computing device can be a personal computer, portable computer, a server, a router, a network computer, a peer device or other common network node, and so on. Logical connections between the computer 201 and a remote computing device 214a,b,c can be made via a local area network (LAN) and a general wide area network (WAN). Such network connections can be through a network adapter 208. A network adapter 208 can be implemented in both wired and wireless environments. Such networking environments are conventional and commonplace in offices, enterprise-wide computer networks, intranets, and the Internet 215.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of multi-caching software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
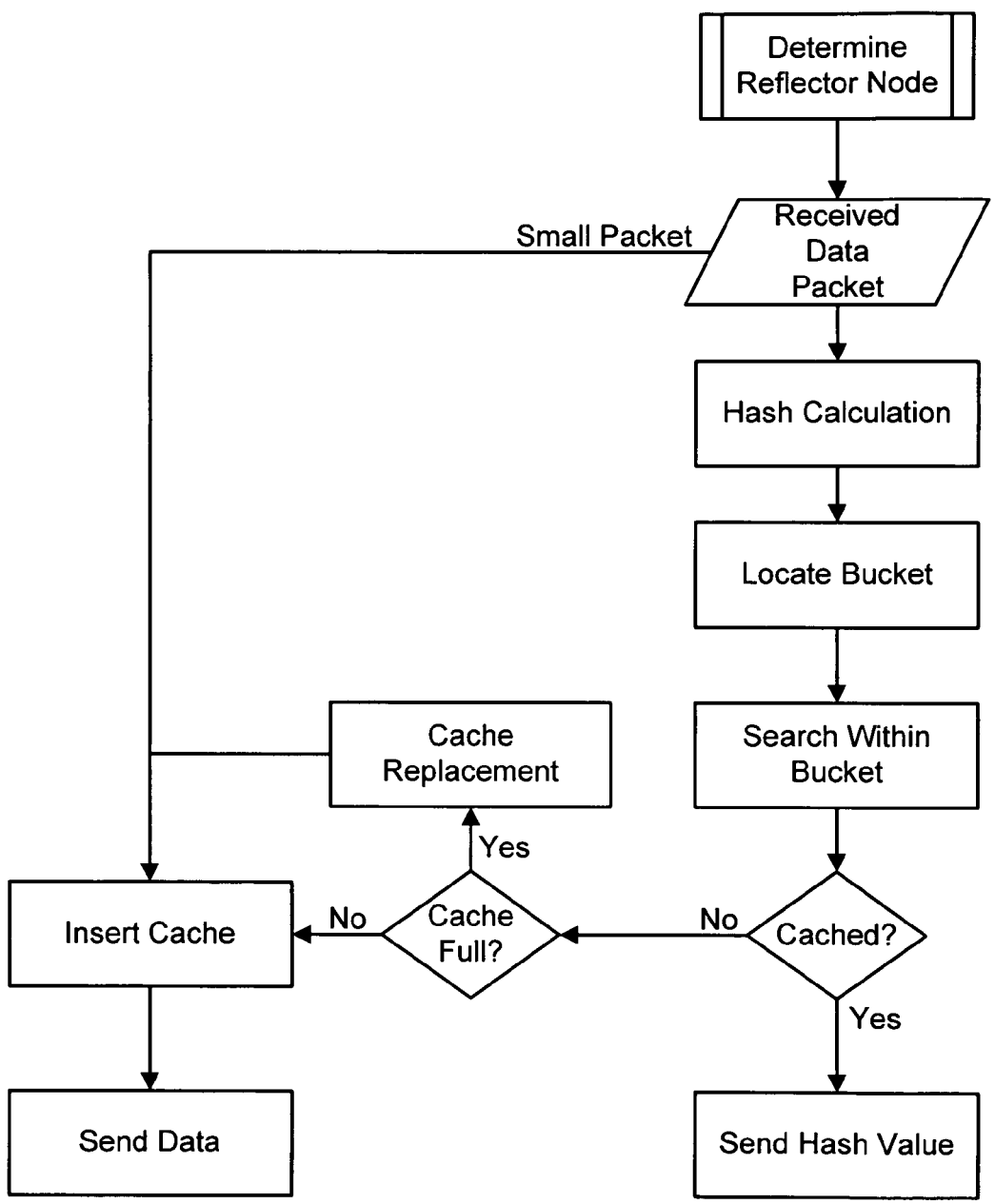
FIG. 3 is an exemplary method of operation.

An exemplary method of operation on a GigaNode is illustrated in FIG. 3. When a packet has to be transmitted to a peer (eventual destination or a reflector node), the caching process can proceed as follows.

In an aspect, after the Reflector node (R) or Destination (D) is decided, the methods can be performed for one or more packets that will be delivered to the Reflector node R or D. If the data to be transmitted is a data packet and the packet size is smaller than the caching threshold, the data packet can be forwarded to R or D. An exemplary caching threshold can be, for example, 16 bytes, 32 bytes, hash size, and the like.

Hashes of the entire data packet (for example, MD5 hashes) and extracted segments are calculated. In an aspect, the hash for the entire data packet can be processed first. If such a hash results in cache-hit, then the hash value can be sent to R or D; otherwise, the hashes of all segments can be processed in a similar way. The first k bits of HASH can be used to index into the cache buckets array. The bucket list can be traversed to determine whether the cache entry already exists. If the cache entry already exists, the hash value of the packet can be transmitted instead of the data. The linked list can be updated to reflect the order of usage frequency. If the cache entry did not exist then, if the number of peer cache entries is less than the MAX_CACHE_SIZE, a new cache entry can be created and linked to the buckets list. Otherwise, if the number of peer cache entries is greater than MAX_CACHE_SIZE, then the least recently used cache entry can be located and deleted. A new cache entry can be created and linked to the bucket list. The data packet can be transmitted with an instruction to create a new cache entry at the peer.

Figure 4:
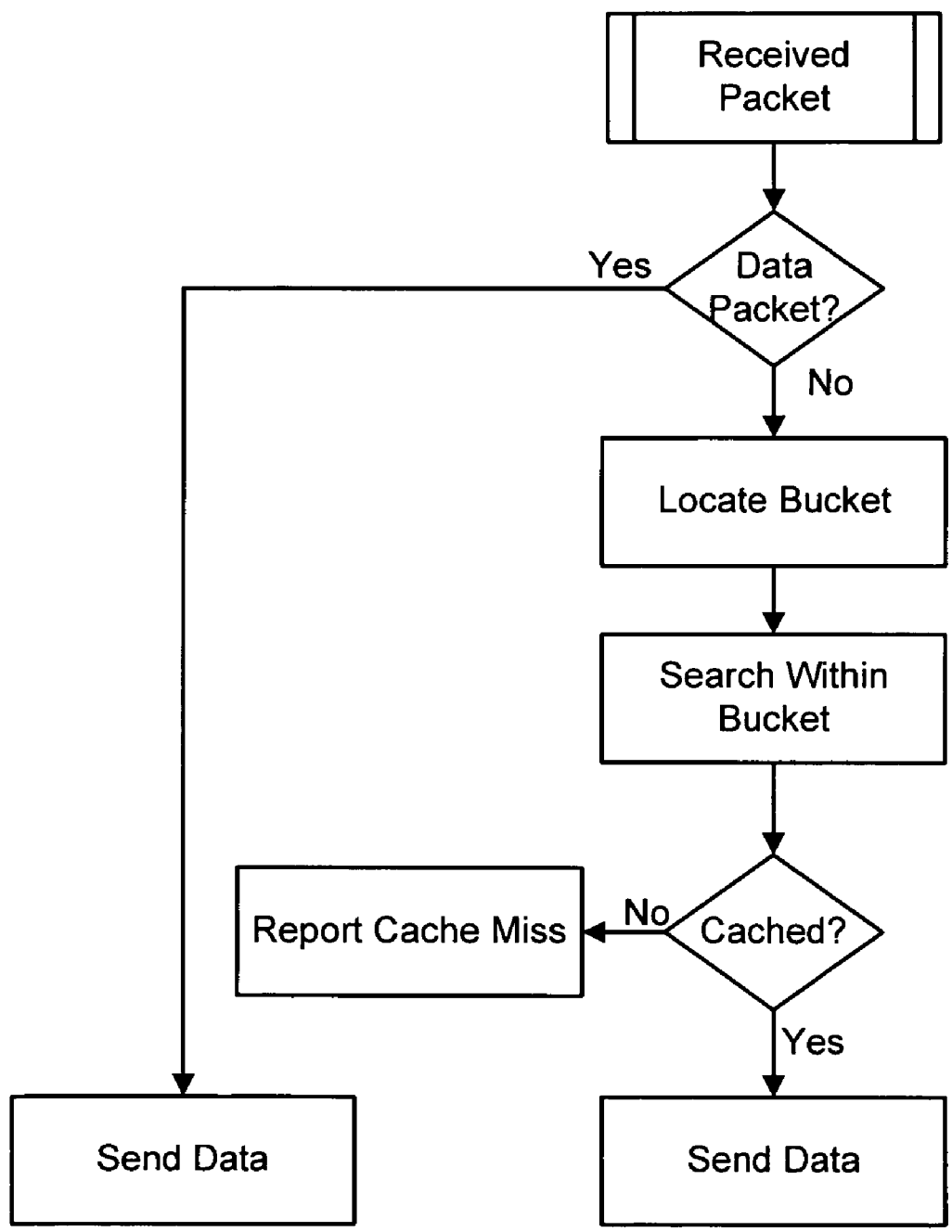
FIG. 4 is an exemplary method of operation.

Provided is an exemplary method of operation of a SoftNode, illustrated in FIG. 4. Upon receiving a packet from a sending GigaNode, the SoftNode can determine whether it contains a hash value or a data packet. If it is a packet containing a hash value, the SoftNode can search the caching space to locate the corresponding cache entry. If the cache entry is found, the corresponding data can be sent to the end user (destination D for Reflection Caching or the application on the same host for Destination Caching). The count value for the packet can be updated.

If the cache entry is not found, that implies there is a cache inconsistency between the SoftNode and the GigaNode. The SoftNode can generate and send a Cache Miss Error message back to the GigaNode, which can send the data packet to the SoftNode, and flag the corresponding cache entry to be the most recent one. Exemplary steps can be as follows. Receive a packet from a GigaNode. If the packet contains a hash value, use the first k bits of the hash value to search the cache buckets array. Traverse the bucket list to determine whether the cache entry already exists. If the cache entry already exists, transmit the hash value of the data packet instead of the data packet. The linked list can be updated to reflect the order of usage frequency. If the cache entry is not found, the SoftNode can return an error message.

If the packet received from the GigaNode is a data packet. It can be determined whether the number of peer cache entries is less than the MAX_CACHE_SIZE. If so, a new cache entry can be created and linked to the bucket list. Otherwise, if the number of peer cache entries is greater than MAX_CACHE_SIZE, the least recently used cache entry can be located and deleted. Then a new cache entry can be created and linked to the bucket list. The data packet can then be transmitted.

Figure 5:
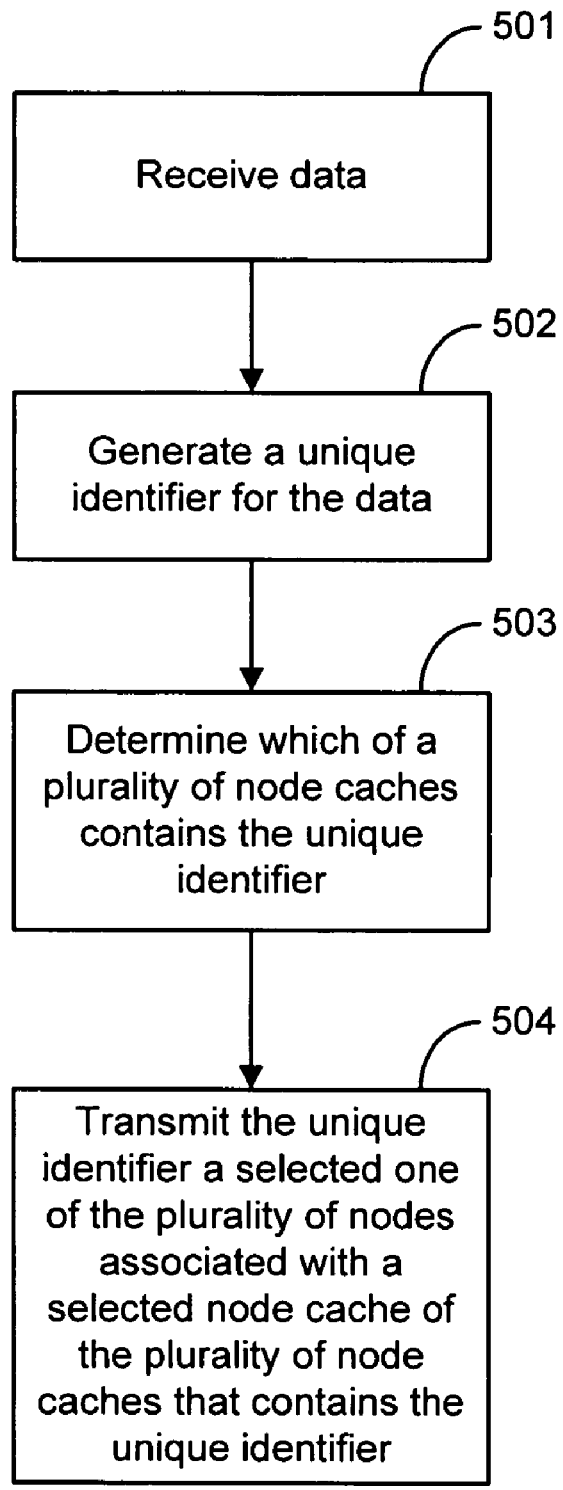
FIG. 5 is an exemplary method of operation.

In an aspect, illustrated in FIG. 5, provided are methods for data multi-caching comprising receiving data at 501, generating a unique identifier for the data at 502, determining which of a plurality of node caches contains the unique identifier at 503, wherein each of the plurality of node caches comprises a cache of stored unique identifiers corresponding to stored data on one of a plurality of nodes, and transmitting the unique identifier a selected one of the plurality of nodes associated with a selected node cache of the plurality of node caches that contains the unique identifier at 504.

Receiving data can comprise receiving a request for data. Generating a unique identifier can comprise generating a hash value. The hash value can comprise a prioritization factor. The prioritization factor can comprise one or more of, bandwidth, frequency of access for a data pattern, importance of peer, and performance history. The data can comprise a plurality of data packets.

Figure 6:
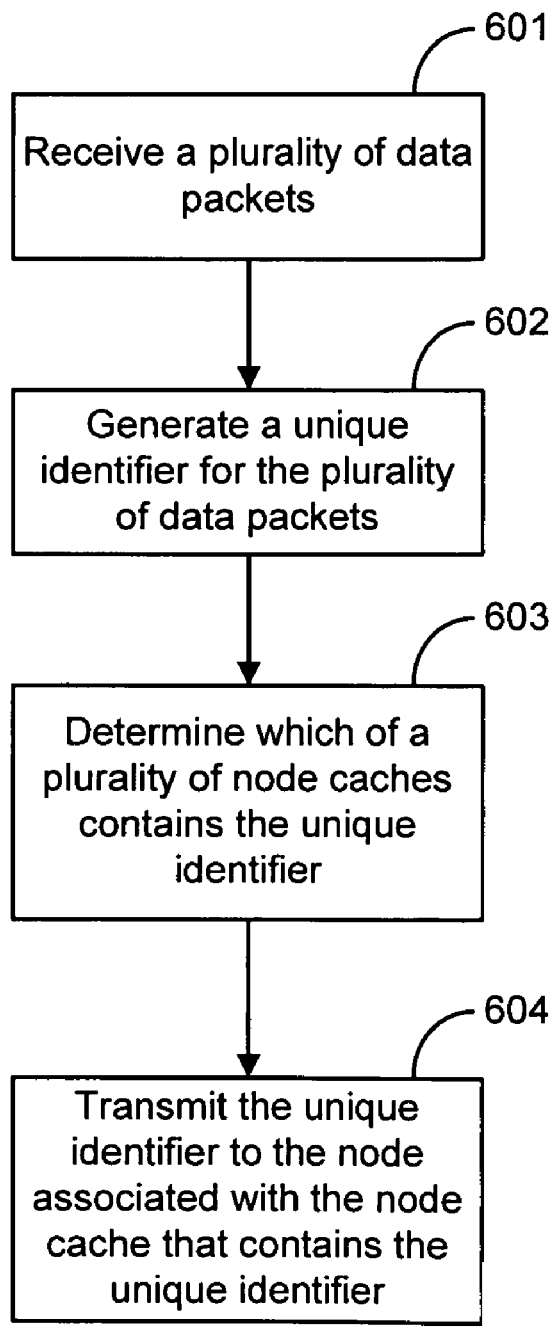
FIG. 6 is an exemplary method of operation.

In another aspect, illustrated in FIG. 6, provided are methods for data multi-caching comprising receiving a plurality of data packets at 601, generating a unique identifier for the plurality of data packets at 602, determining which of a plurality of node caches contains the unique identifier at 603, wherein each of the plurality of node caches comprises a cache of unique identifiers corresponding to data stored on one of a plurality of associated nodes, and transmitting the unique identifier to the node associated with the node cache that contains the unique identifier at 604.

Receiving data can comprise receiving a request for data. Generating a unique identifier can comprise generating a hash value. The hash value can comprise a prioritization factor. The prioritization factor can comprise one or more of, bandwidth, frequency of access for a data pattern, importance of peer, and performance history. The plurality of packets can comprise a first partial packet, at least one full packet, and a second partial packet.

Figure 7:
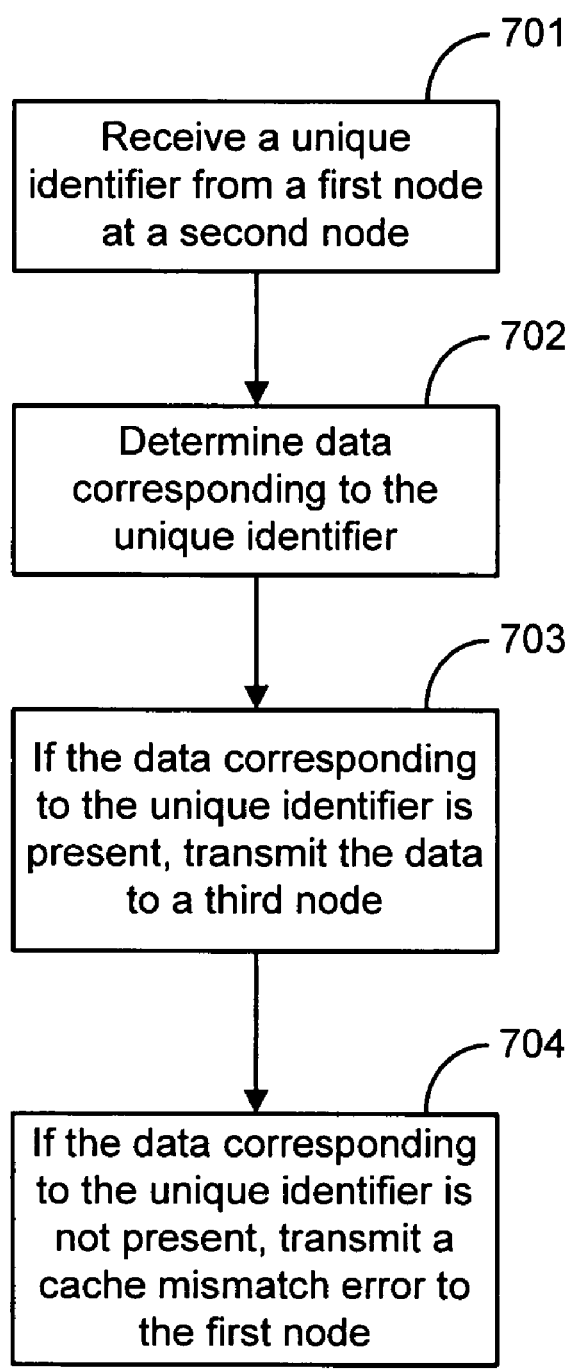
FIG. 7 is an exemplary method of operation.

In another aspect, illustrated in FIG. 7, provided are methods for data multi-caching, comprising receiving a unique identifier from a first node at a second node at 701, determining data corresponding to the unique identifier at 702, if the data corresponding to the unique identifier is present, transmitting the data to a third node at 703, and if the data corresponding to the unique identifier is not present, transmitting a cache mismatch error to the first node at 704.

Receiving a unique identifier from a first node can comprise receiving a hash value. Determining data corresponding to the unique identifier can comprise searching a local cache. Transmitting the data to a third node can comprise transmitting the unique identifier. The methods can further comprise, if the data corresponding to the unique identifier is present and the second node is the destination node, retrieving the data.

Figure 8:
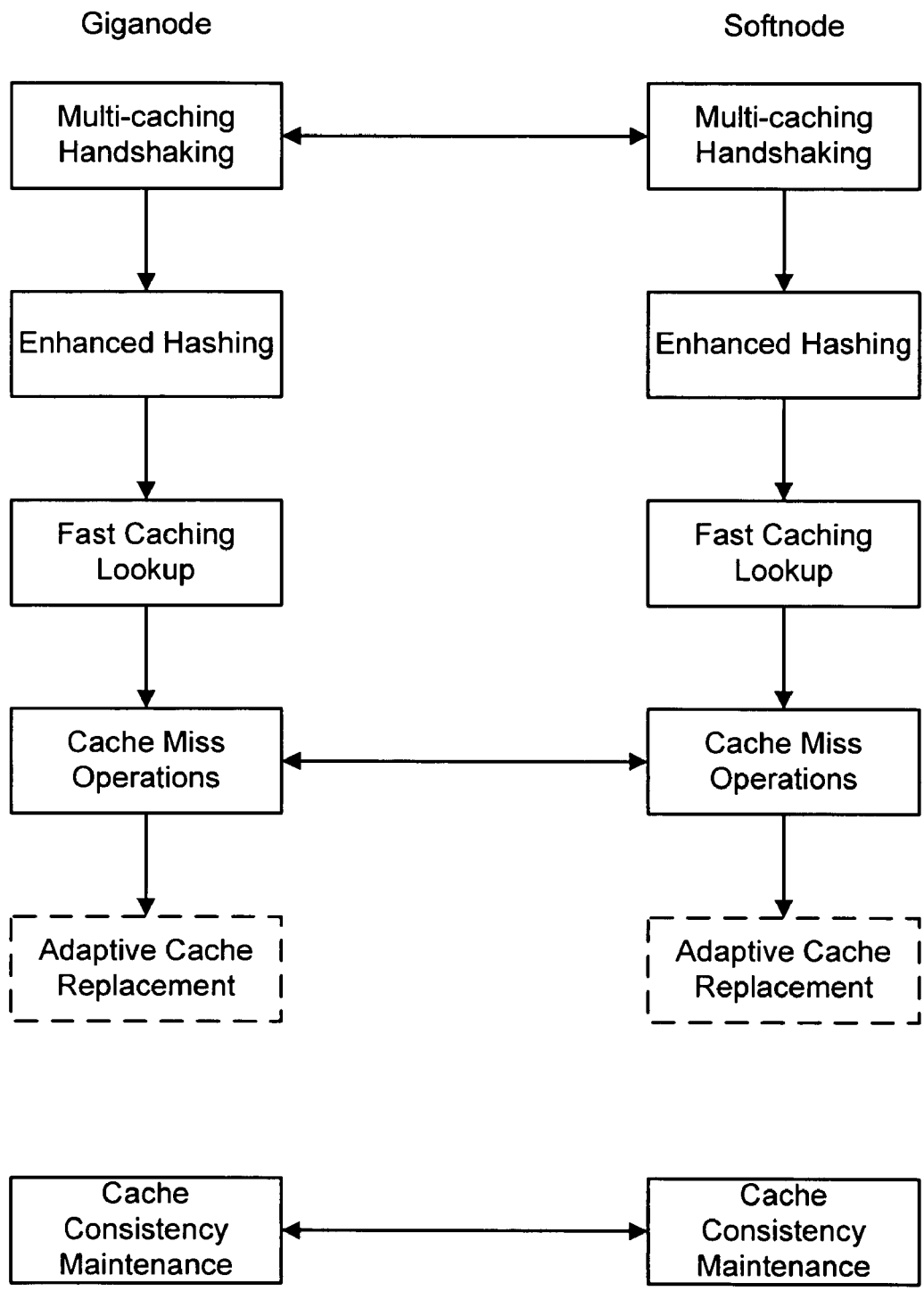
FIG. 8 is an exemplary high-level data path of packets traversing the methods and systems provided.

In an aspect, illustrated in FIG. 8, provided is an exemplary high-level data path of packets traversing the methods and systems provided. Multi-caching Handshaking→Enhanced Hashing→Fast Caching Lookup→(Cache Miss Operations)→(Adaptive Cache Replacement)→Cache Consistency Maintenance.

In an aspect, the methods and systems for multi-caching can comprise one or more of the following components, Multi-caching Handshaking, Enhanced Hashing, Hash Aggregation, Fast Caching Lookup, Adaptive Caching Replacement, Cache Consistency Maintenance, Cache Miss Operations, Destination Caching, and Boundary-shifting Resilience, and Super Caching.

In an aspect, multi-caching can be used by two or more nodes, for example a GigaNode and a SoftNode, to reduce the traffic sent between them. Before the multi-caching benefits can be realized, the nodes can exchange information used by both of them. For example, the nodes can exchange cache related information. This stage of exchanging common information can be referred to as a handshaking stage. To ensure a high-probability of cache consistency between the two communicating entities, values of parameters have to be the same on either side. For example, these parameters can comprise one or more of: (a) the size of buckets array (K), (b) the maximum bucket size (MAX_BUCKET_SIZE), (c) maximum caching size (MAX_CACHE_SIZE) and (d) cache replacement algorithm and related parameters. For parameters a, b and c, after learning the values supported by the other side, both sides can select the minimum value when unequal values are reported. For parameter d, different replacement algorithms can be sorted in preference order, and the most preferred algorithm can be selected.

In order to perform caching on a large scale at a packet level, an appropriate hashing algorithm can be used to generate digest information for a given data packet (i.e., a unique identifier). An example hashing mechanism that multi-caching can employ is the MD5 hashing algorithm. Other hashing algorithms that can be used include, but are not limited to, HAVAL, MD2, MD4, PANAMA, RadioGatún, RIPEMD, RIPEMD-128/256, RIPEMD-160/320, SHA-0, SHA-1, SHA-256/224, SHA-512/384, Tiger(2)-192/160/128, WHIRLPOOL, and the like. A widely used cryptographic hash function, MD5 can be used to create cache tokens for the corresponding data in the cache entry. MD5 has been employed in a wide variety of security applications, and is commonly used to check the integrity of files. A MD5 hash is typically is a 128-bit (16 Bytes). MD5 can ensure that the probability of two different packets resulting in an identical hash value is less than $10^{-37}$. Although some advances in security have shown this technique cannot protect against certain forms of malicious tampering (i.e., it is possible for the person who created the file to create a second file with the same checksum) it is well suited for less malicious environments.

In an aspect, an enhanced version of a hashing algorithm can be used, for example, an enhance version of MD5. Since a purpose of using a hashing algorithm such as MD5 is to generate a unique digest, some constraints and assumptions of the MD5 algorithm can be relaxed for other benefits, for instance, facilitating SoftNode prioritization. Multi-caching can prioritize participating SoftNodes for various purposes such as incentives for contributing bandwidths. If higher priority is desired to be assigned to some SoftNodes, those SoftNodes' identification information (say, IP address) can be included in the hashing algorithm to obtain a deterministic cache location (for example, a particular bucket). If cache location can be differentiated in terms of different privilege, SoftNodes can be treated with different priorities. For example, if an end user needs to be treated with higher priority, the packets targeted at that end user can be deterministically hashed to certain privileged buckets that feature first-class processing capabilities.

Figure 9:
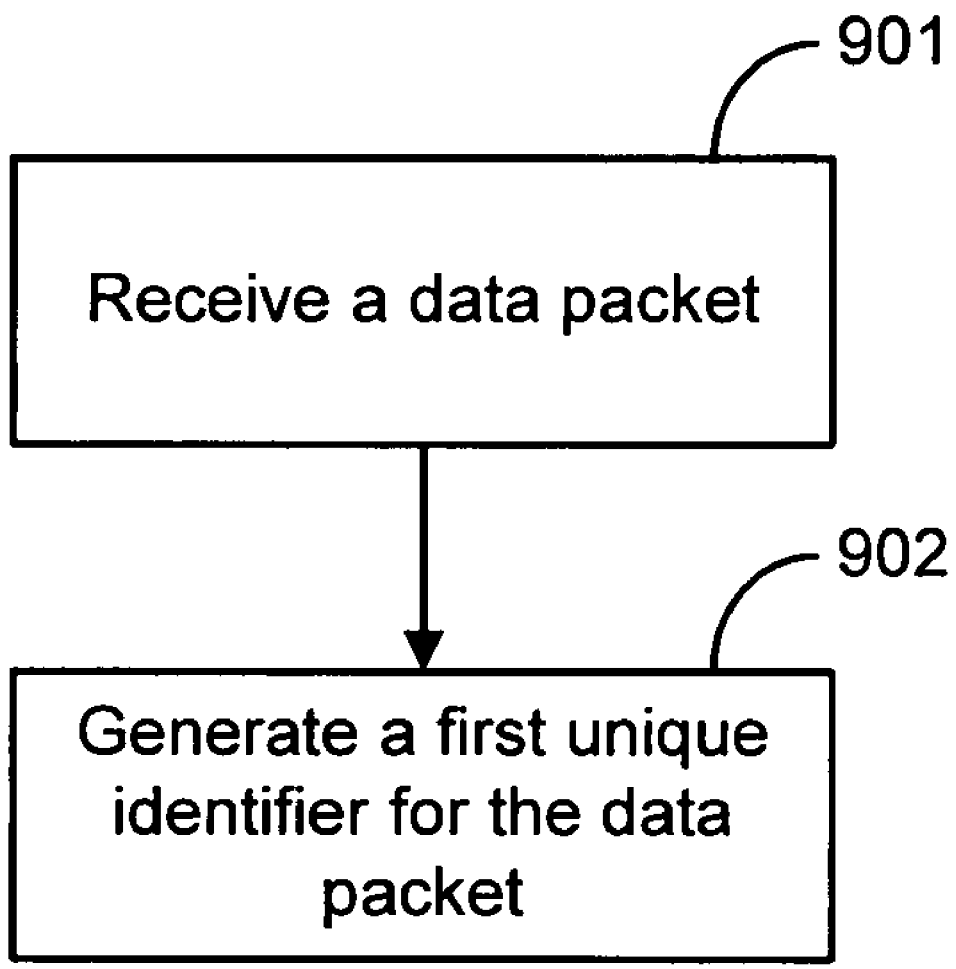
FIG. 9 is an exemplary method of operation.

In an aspect, illustrated in FIG. 9, provided are methods for multi-caching comprising receiving a data packet at 901 and generating a first unique identifier for the data packet at 902, wherein the first unique identifier comprises a cryptographic hash and a prioritization factor. Generating a first unique identifier can comprise generating a hash value. Generating a hash value can comprise the MD5 algorithm.

The methods can further comprise transmitting a set of unique identifiers in a single data packet. Generating a first unique identifier for the data packet can comprise generating a plurality of unique identifiers for a first plurality of data packets and generating a second unique identifier for the first plurality of unique identifiers. The methods can further comprise receiving a third unique identifier for a second plurality of data packets and determining if the third unique identifier matches the second unique identifier.

Another optimization that can be used by the methods and systems provided is hash aggregation. Instead of sending the hash corresponding to a single data packet to a reflector R or the destination D, the sender can choose to wait for a collection of hashes corresponding to multiple data packets (all destined to the same reflector or same destination) and aggregate the hashes into a single data packet and send the aggregate packet to R or D. This can further reduce header overheads associated with communicating the hashes to the reflector or destination.

Figure 10:
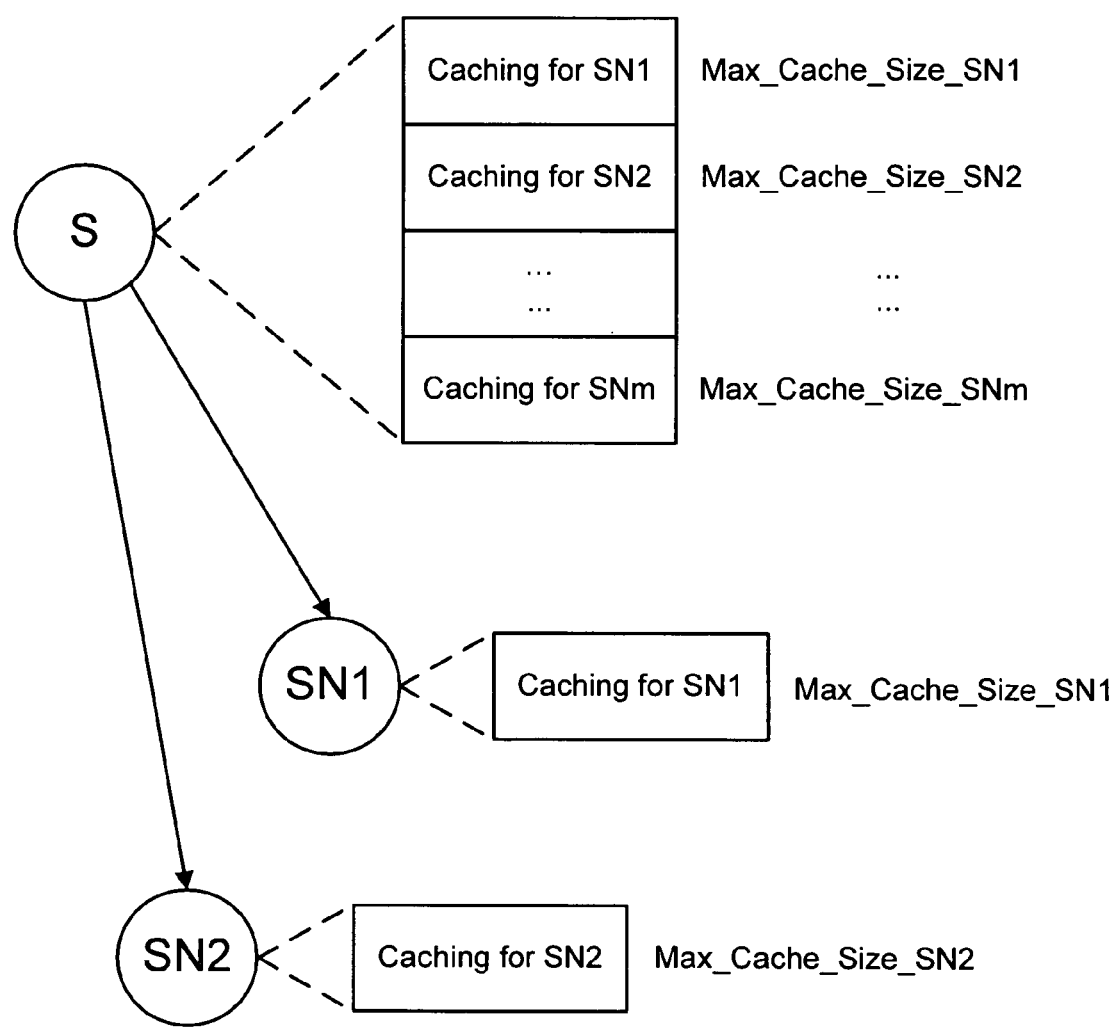
FIG. 10 illustrates exemplary caches.

A GigaNode that resides right in front of application servers can be responsible for delivering data to the end users. Depending on the scenario, the GigaNode can deliver data using a specifically designed pool of reflectors (SoftNodes). The pool can be chosen on a per-connection basis or a per-destination basis, etc. . . . Under such circumstances, the GigaNode can create and maintain a cache for every reflector it makes use of, as shown in FIG. 10. The undertaking of maintaining a separate caching space for each SoftNode can be referred to as Peer-based Caching. (Note that both SoftNodes and GigaNodes can serve as reflectors. When deployed in networks other than the location immediately in front of web servers, GigaNodes can be SoftNodes.).

The decision on which particular peer to use for a given data packet can be referred to as location determination. If a data routing algorithm is executed before multi-caching the resulting data route(s) can be fed as input into the methods and systems provided. Accordingly the methods and systems can perform a cache lookup for the particular node(s) according to the data route. However, if the routing is left to the present methods and systems, the specific peer (node, SoftNode reflector, etc. . . . ) may be chosen based on optimization criteria of interest such as cache hit status, peer performance, path performance, peer load, etc. . . .

Figure 11:
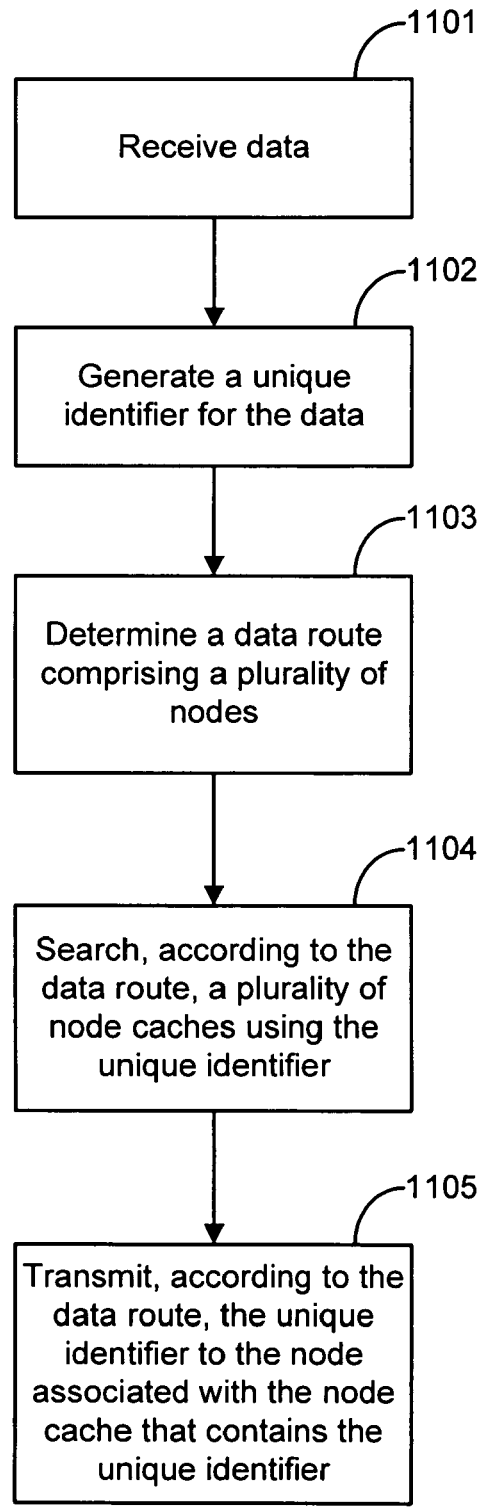
FIG. 11 is an exemplary method of operation.

In an aspect, illustrated in FIG. 11, provided are methods for data multi-caching, comprising receiving data at 1101, generating a unique identifier for the data at 1102, determining a data route comprising a plurality of nodes at 1103, searching, according to the data route, a plurality of node caches using the unique identifier at 1104, wherein each of the plurality of node caches comprises a cache of unique identifiers corresponding to data stored on one of a plurality of associated nodes, and transmitting, according to the data route, the unique identifier to the node associated with the node cache that contains the unique identifier at 1105.

Receiving data can comprise receiving a request for data. Determining a data route comprising a plurality of nodes can comprise determining one or more data route optimization parameters. Determining a data route comprising a plurality of nodes can comprise receiving a pre-defined data route.

Figure 12:
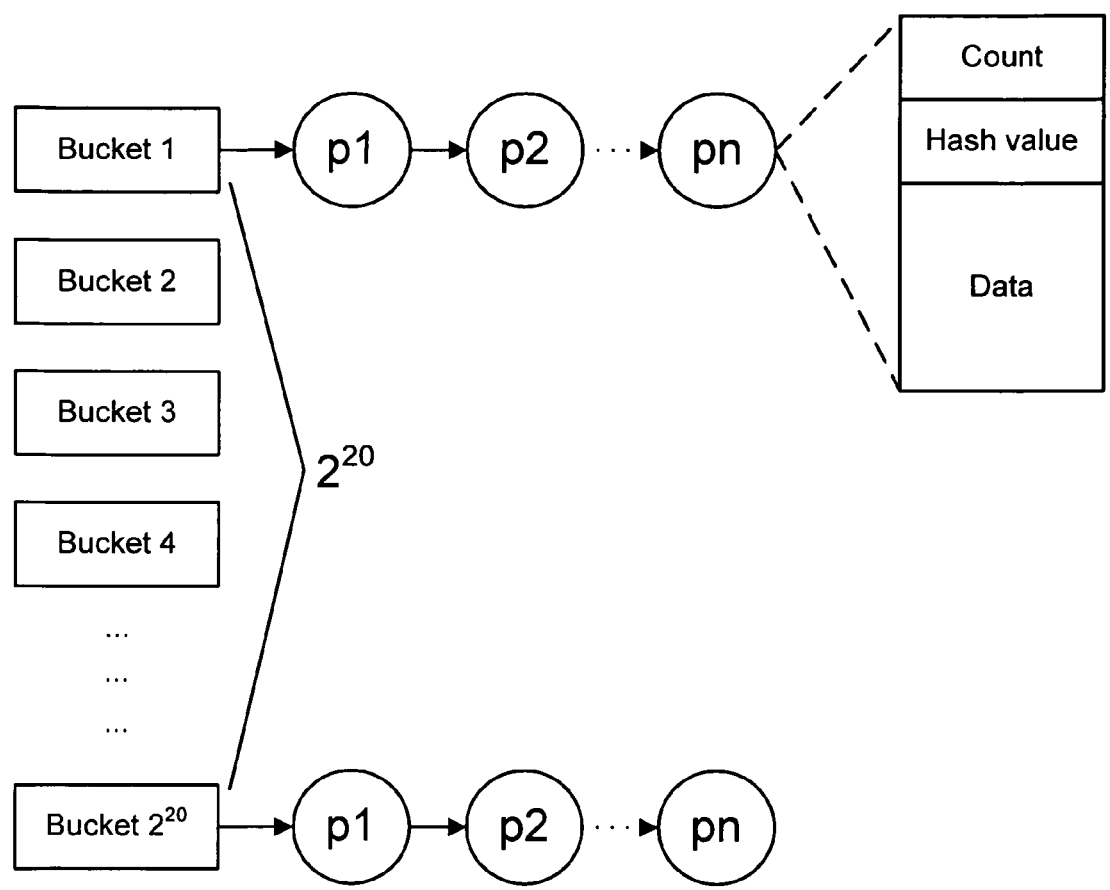
FIG. 12 illustrates exemplary cache entries organized into a linked list.

Each peer cache can be maintained, for example, by using an array of hash buckets. Within the buckets, cache entries can be organized as a linked list, as shown in FIG. 12. The number of hash buckets can be configurable (default=$2^{20}$). When buckets are used and when a cache entry has to be located then the first k (default value of k=$2^{20}$) bits of the MD5 hash can be used to identify the bucket. Then the linked list for this bucket can be traversed to locate the specific cache.

An array of buckets allows for a small search time since the array provides random access. For example, when a default value of k ($2^{20}$) is used and the total number of cache entries is n, then on average, searching for a cache-hit entry only takes $n/2^{21}$ times of lookup, while searching for a cache-missed entry takes $n/2^{20}$ of lookup. One of the properties of MD5 hash is uniformed distribution of hashing values, meaning all the packets are almost equally likely hashed to all buckets. Thus, the worst performance of searching for entries would not be significantly bad.

The GigaNode can use Peer-based Caching and can maintain a separate cache space for each of its corresponding active SoftNodes. In order to maximize scalability, the data storage can be separated from the hash storage. In other words, the buckets point to linked lists, and the linked list comprises the non-data information such as the hash values. The raw data contents can be maintained in the data space. With this separation, if SoftNodes have overlapping data, the caches on the GigaNode can maintain a single copy of the overlapping data.

To maximize the caching efficiency and achieve cache persistency, the methods and systems can implement a multi-level caching hierarchy that can comprise random access memory and disk space. This two-level caching hierarchy can utilize both the much larger disk space and the higher speed of memory access. This design can help SoftNodes recover caching state during failures (for example, machine rebooting).

The methods and systems can open n files on the SoftNode's disk, and each such file can comprise k cache entries. Each of the cache entries can comprise one or more of, the hashing value, raw data, peer address, and data length.

The random access memory cache can store a subset of the disk cache. When the SoftNode machine restarts, the memory cache is lost, while the disk cache is maintained.

Figure 13:
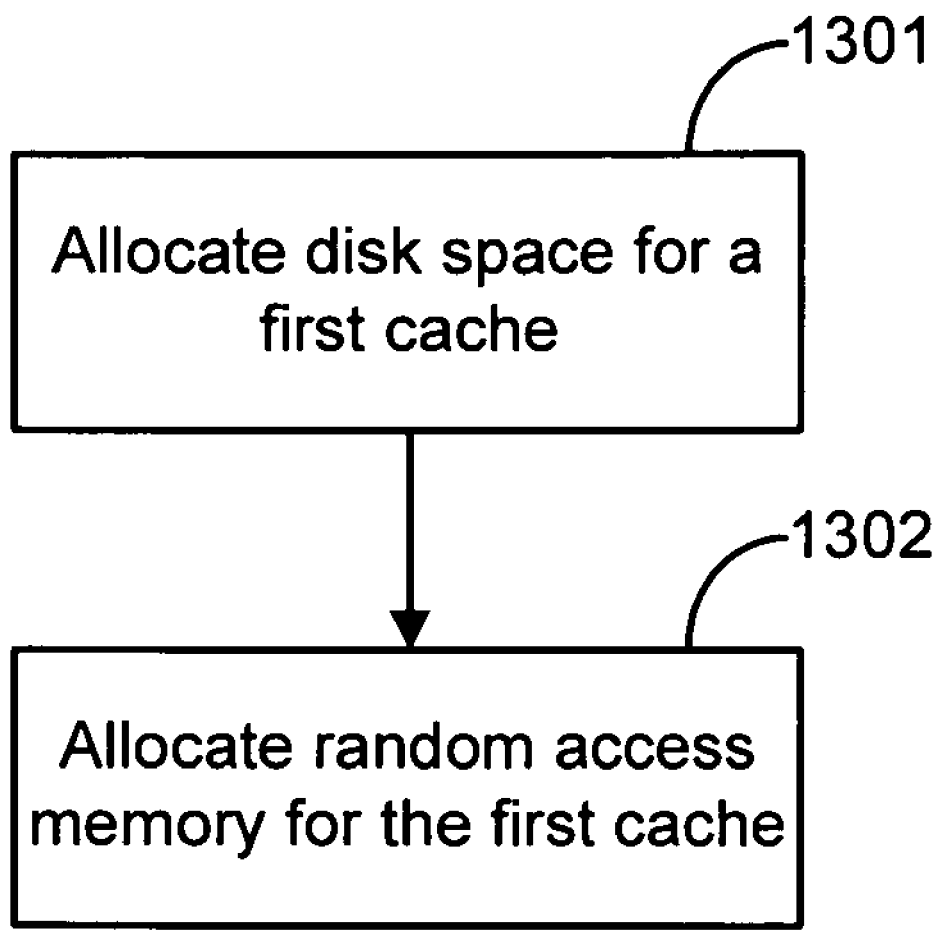
FIG. 13 is an exemplary method of operation.

In an aspect, illustrated in FIG. 13, provided are method for multi-caching, comprising allocating disk space for a first cache at 1301, wherein a plurality of cache entries are stored on the allocated disk space and allocating random access memory for the first cache at 1302, wherein the random access memory stores a subset of the disk cache.

The methods can further comprise repeating 1301 and 1302 for a second cache, wherein the first cache represents data and associated unique identifiers stored on a first node and the second cache represents data and associated unique identifiers stored on a second node. In an aspect, only one instance of overlapping data between the first cache and the second cache can be stored on disk space.

The methods can comprise generating a main cache on the allocated disk space and implementing an adaptive cache replacement policy. The adaptive cache replacement policy comprises monitoring a cache entry size parameter "S", a cache entry age parameter "A", and a peer performance history parameter "P". The methods can further comprise monitoring a maximum cache size and a maximum bucket size for the main cache and replacing a cache entry when either the maximum cache size or the maximum bucket size is reached. The adaptive cache replacement policy can replace a cache entry according to the cache entry size parameter, the cache entry age parameter, and the peer performance history parameter. The cache entry can be replaced is the cache entry with a maximum value of a plurality of tuples. The plurality of tuples can comprises (A, S, 1/P), (A, 1/P, S), (S, A, 1/P), (S, 1/P, A), (1/P, S, A), and (1/P, A, S).

The first cache can comprise a first cache structure comprising a size of buckets array (K) attribute, a maximum bucket size (MAX_BUCKET_SIZE) attribute, a maximum caching size (MAX_CACHE_SIZE) attribute, and a cache replacement algorithm. The methods can further comprise transmitting the first cache structure and receiving a second cache structure from a remote node.

In an aspect, the methods and systems provided can use a caching replacement policy that can adapt the replacement algorithm to application behaviors. The methods and systems can use a unique combination of parameters to decide on the replacement. The parameters can be, for example, cache-entry size (S), "age" of the cache-entry (A), and the performance history of the peer for which that cache-entry is maintained (P). P can be measured in terms of the data rate supported by that peer (both as a destination and as a reflector) in the past.

The replacement policy can use one of six different combinations to decide which entry to replace. The policy can select the entry with the maximum value for one of the following tuples: (A, S, 1/P), (A, 1/P, S), (S, A, 1/P), (S, 1/P, A), (1/P, S, A), (1/P, A, S). The ideal combination can depend on the nature of the traffic. The methods and systems can track the performance of all combinations and select the combination that delivers the best performance for the current characteristics of the traffic.

When the total caching size reaches MAX_CACHE_SIZE, or the bucket size reaches MAX_BUCKET_SIZE, an existing cache entry can be replaced by a newer entry, and the entry that has been used least recently (or least frequently) can be replaced with the newer cache entry. The entry to be replaced can be selected based on the above algorithm.

In another aspect, the methods and systems provided can use a caching replacement policy that can adapt the replacement algorithm to application behaviors. The replacement algorithm can combine the benefits of a plurality of caching algorithms. For example, both Last Recently Used (LRU) and Last Frequently Used (LFU) can be used and the caching size used by LRU and LFU can be dynamically adjusted. Other caching algorithms can be used, for example, Most Recently Used, Pseudo-LRU, 2-way set associative, direct mapped cache, and the like.

Figure 14:
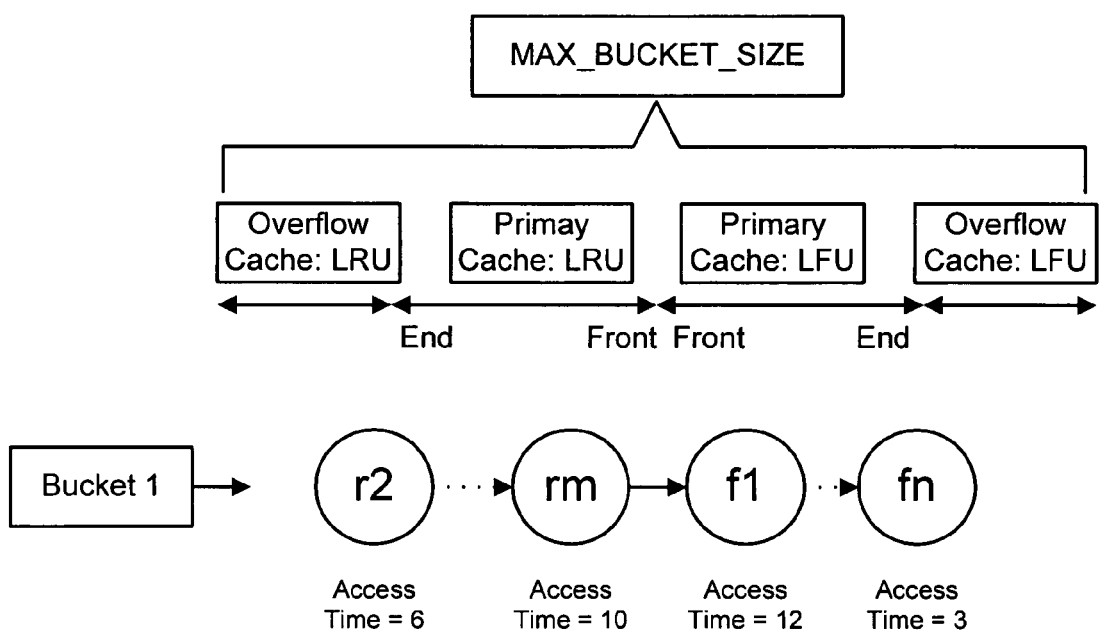
FIG. 14 is an exemplary cache structure.

In an aspect, the total cache size can be C, and can be split into two parts of sizes C/2 each. The first C/2 sized cache can be referred to as the "Primary Cache," while the second C/2 sized cache can be referred to as the "Overflow Cache." The primary cache space within a bucket can be further divided into two portions: one portion used for LRU and the other portion for LFU, as shown in FIG. 14. The space for LRU can comprise the cache entries that are accessed once, while the space for LFU can comprise the entries that are used more than once. Initially the two parts can be assigned equal space.

As more and more packets are identified to be pro-LRU, meaning LRU can achieve better performance; the cache size assigned to LRU can be gradually increased. Similarly, as more packets are pro-LFU, then the LFU size can inflate. If there is a primary cache miss, the overflow cache can be checked. If the overflow cache has the packet, and the reason that packet was removed from the primary cache was a specific algorithm (for example, LRU, indicated from the location of the overflow cache), then the size of the LFU portion of primary cache can be increased and the size of the LRU portion of the primary cache can be decreased.

When the total caching size reaches MAX_CACHE_SIZE, or the bucket size reaches MAX_BUCKET_SIZE, an existing cache entry can be replaced by a newer entry, and the entry that has been used least recently (or least frequently) can be replaced with the newer cache entry. In both portions, the most recently requested entry can be put in front of the list, while the least requested entry can be put in the back of the list. Thus, new entries entering each space can be firstly put to the left of the space, and gradually pushed to the left, eventually being evicted. Any entry in LRU space that gets referenced once more, gets another chance, and enters LFU space. From there, the entry can again be pushed outward. Entries in LFU space that get another hit can repeat this indefinitely, until they finally drop out.

In an aspect, cache lookup can be performed on S with the assumption that S and R maintain synchronized caching storage. Since (1) the caching sizes on both peers are the same, and (2) the caching replacement algorithms used by both peers are the same, most of the buckets on both sides are consistent and the cache entries are the same.

Figure 15:
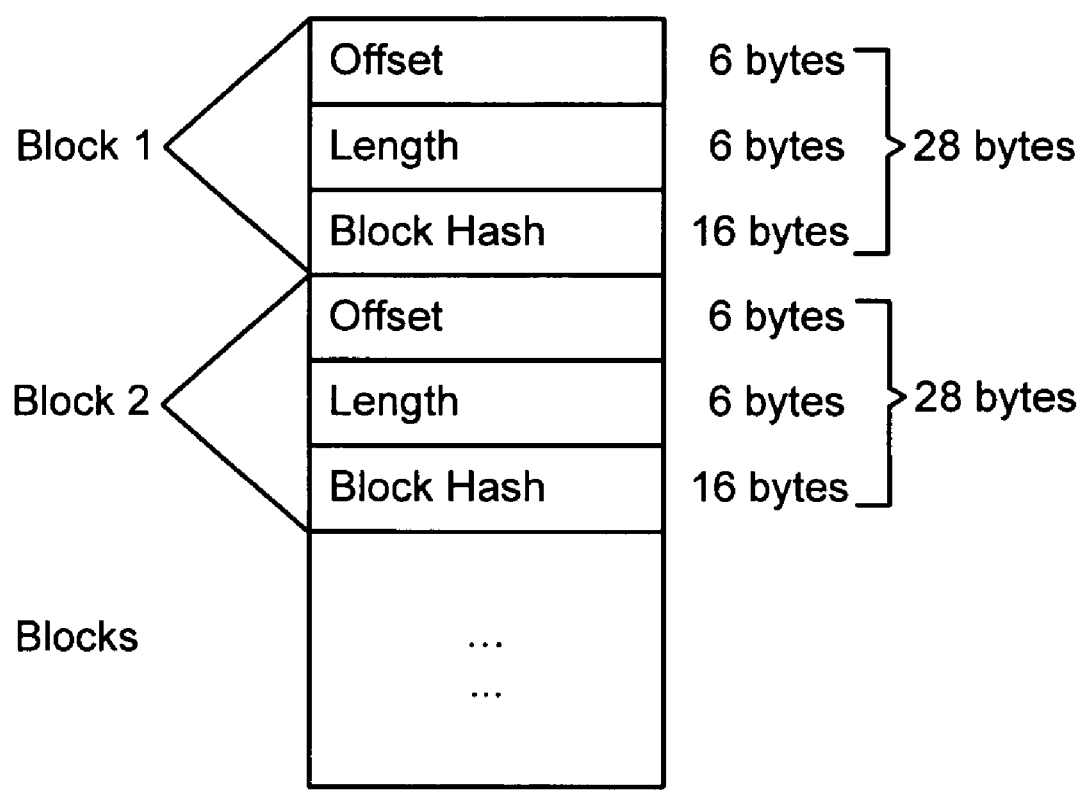
FIG. 15 is an exemplary header.

To ensure high reliability of cache state consistency between peers, the methods and systems can utilize an adaptive caching consistency check mechanism. A listing of hashes and data corresponding to each hash, also referred to as a cache map, on a GigaNode can be hashed into MD5 hashes, and transmitted to a SoftNode which can perform a consistency check. Specifically, the GigaNode or the SoftNode can invoke the consistency check mechanism periodically. The GigaNode can select a value of Ks (Ks<K) and every $2^{Ks}$ buckets can be grouped into a block. The hash values inside each block can then be hashed, for example with an MD5 algorithm. The resulting hash values can be sent to the SoftNode, along with appropriate location information. An exemplary header format of a message is shown in FIG. 15.

Figure 16:
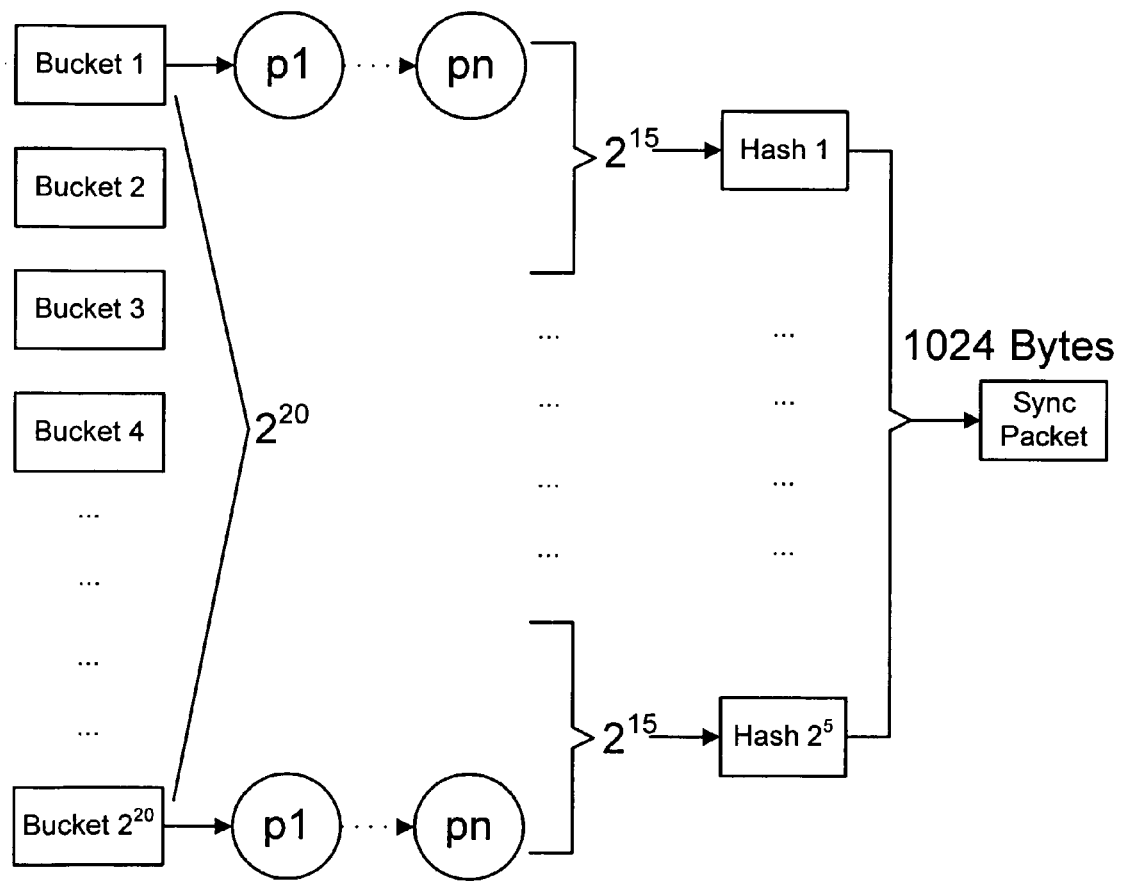
FIG. 16 is an exemplary cache consistency check.

The consistency check mechanism can be performed adaptively with decreasing Ks values, as shown in FIG. 16. The probability of cache inconsistency is relatively small, which is typically true given the enforced identical cache sizes and cache replacement algorithm on both sides. In an aspect, initially a Ks value can be set to 15. This can result in $2^{20-15}=32$ blocks. If inconsistency is detected on the SoftNode side, the GigaNode can be notified of the inconsistent block id (offset). Then, a smaller Ks value can be selected (for example, 10) which can be used to split the inconsistent block into smaller blocks. This process can be repeated until the block size reduces to 1, meaning each block contains only one bucket. Note that for illustration purpose, the minimum Ks value is set to 0. However, to better multiplex blocks, Ks can have larger values.

Once inconsistency is identified between GigaNode and SoftNode, operations need to be performed to explicitly restore cache consistency. Cache consistency can be defined as the intersection of the two cache sets on both sides. For example, if the GigaNode has cache entries 1, 3, and 5 and the SoftNode has 1, 3 and 6, then their consistent caches will both contain entries 1 and 3 (the intersection) only. The reason for performing such type of cache consistency is that if a cache entry needs to be transmitted from one side to the other side, the introduced cost is the same as a cache miss. Moreover, the transmitted cache entries will not necessarily be used in the future before they are replaced.

Figure 17:
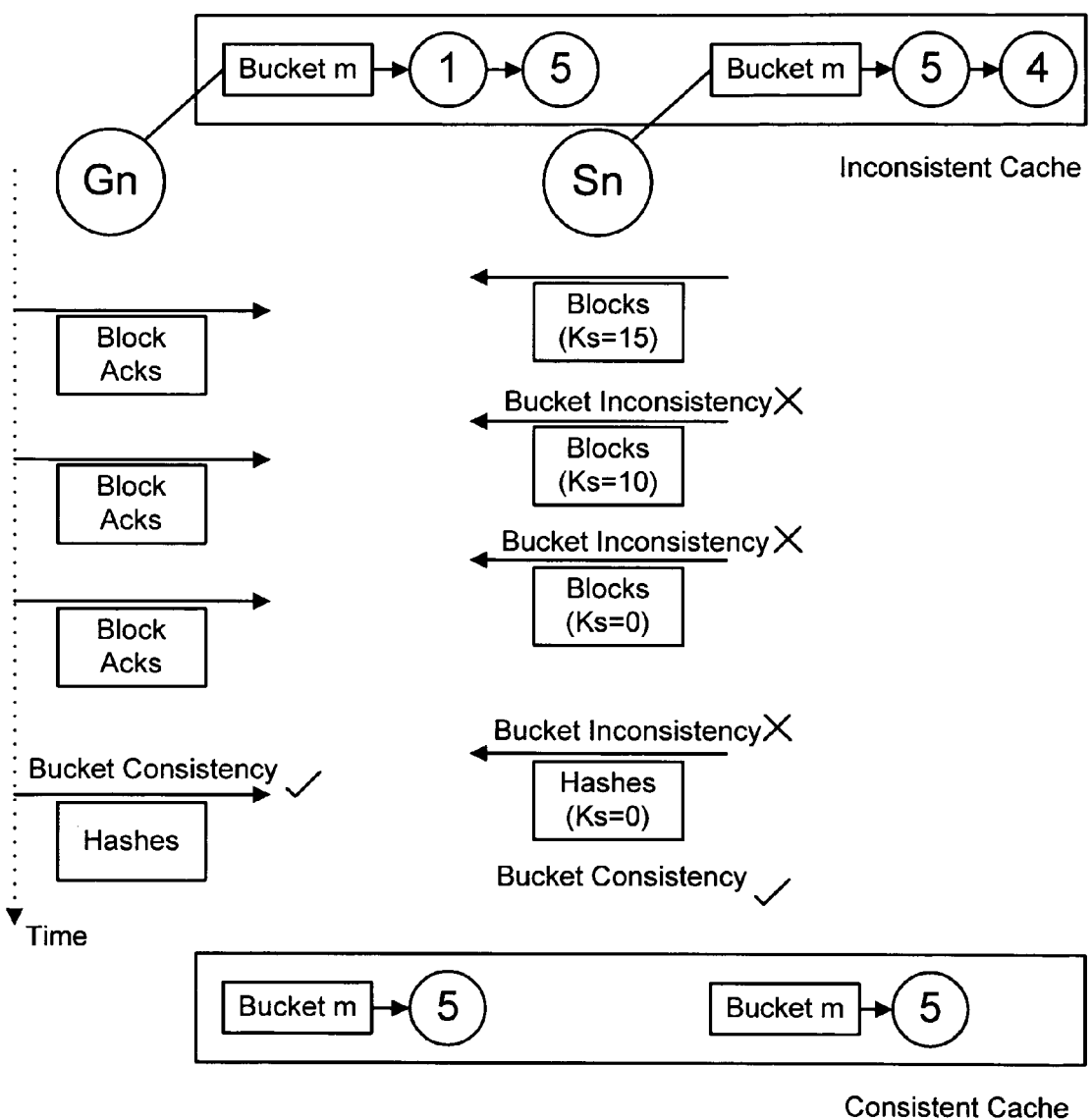
FIG. 17 is an exemplary method for enforcing cache consistency.

Once inconsistency is identified, the GigaNode can explicitly synchronize with the SoftNode by transmitting the hashing values in the bucket. These steps are illustrated in FIG. 17. During the last two steps (Ks=0), the SoftNode can send hashing values of entries 4 and 5 to the GigaNode. After receiving these hashing values, the GigaNode can discard cache entry 1, and send back the hashing value of entry 5 only. Then the SoftNode can learn the cache state of the GigaNode and discard cache entry 4.

Figure 18:
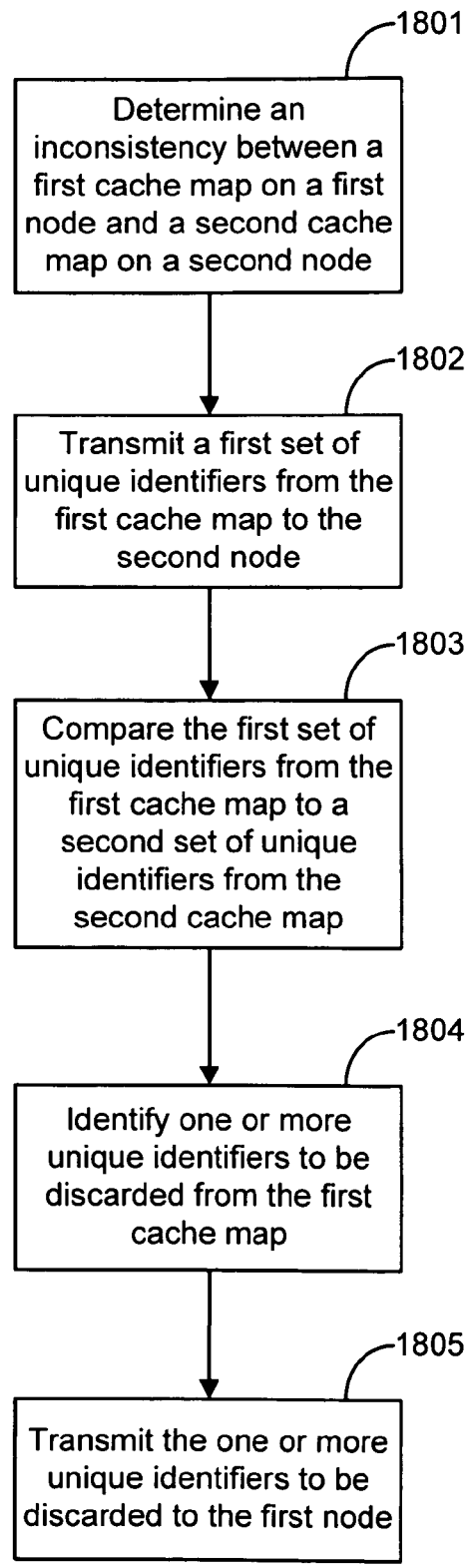
FIG. 18 is an exemplary method of operation.

In an aspect, illustrated in FIG. 18, provided are methods for multi-caching, comprising determining an inconsistency between a first cache map on a first node and a second cache map on a second node at 1801, transmitting a first set of unique identifiers from the first cache map to the second node at 1802, comparing the first set of unique identifiers from the first cache map to a second set of unique identifiers from the second cache map at 1803, identifying one or more unique identifiers to be discarded from the first cache map at 1804, and transmitting the one or more unique identifiers to be discarded to the first node at 1805.

The first cache map can comprise data and unique identifiers associated with the data stored on the first node and the second cache map comprises data and unique identifiers associated with the data stored on the second node. Determining an inconsistency between a first cache map on a first node and a second cache map on a second node can comprise generating a first unique identifier for a for a first cache map at a first node, transmitting the unique identifier to a second node, generating a second unique identifier for a second cache map at the second node, and comparing the first unique identifier and the second unique identifier to determine consistency of the first cache map and the second cache map.

The cache lookup operations can also occur at the end host, the ultimate data receiver. The undertaking of performing multi-caching between the GigaNode and the end host can be referred to as Destination Caching. Destination Caching is different from its counterpart—Reflector Caching, which performs caching lookup on the reflectors and the GigaNode.

Destination caching can specifically optimize the scenarios where the end host asks the same set of application data multiple times. After the application data are delivered to the end host, they can be cached on the end host. Thus, subsequent requests asking for the same set of data can be optimized by destination caching.

With destination caching, if the GigaNode determines that the end host already cached the data packets, it can send the hashing values instead of the raw data packet. The GigaNode can deliver the hashing values along certain paths through reflectors. Unlike the reflector caching, where the reflector performs caching lookup, destination caching allows the reflectors to "pass through" the packets working on destination mode. Thus, after receiving the packets optimized by destination caching, the reflector can simply forward the packets towards the end host.

Although the consistency of caching states on two sides can be checked periodically, there can still be instances where caching states are not consistent. Thus, when a caching entry exists on S, but does not exist on D, a cache miss event can occur.

When a SoftNode receives a packet containing a hash value from the transmitting GigaNode, the SoftNode can determine whether its cache contains a cache entry corresponding to the hash value by performing a cache lookup. If the cache entry is found, the corresponding data (or hash value) can be forwarded along the data route. The count value for the packet can also be updated. If the cache entry is not found, there is a cache inconsistency between the SoftNode and the GigaNode. The SoftNode can generate and transmit a Cache Miss Error message back to the GigaNode. After receiving the message, the GigaNode can send the data packet to the SoftNode. If a sufficient number of such events occur, the GigaNode can determine that the degree of cache inconsistency is significant enough to invoke a cache consistency check.

The above-mentioned techniques can be performed at the packet level for ease of illustration. Although these mechanisms have various advantages including easy implementation, provided are further methods and systems that take into account finer granularity of data repetition. For instance, if a cache entry corresponds to a data packet with bytes numbered from 1 to 1000, another packet with bytes 2 to 1001 will be treated as new data and result in a cache miss despite the mere one-byte difference. Several reasons can be attributed to such behavior. One reason is the unpredicted sending of partial packets (packets of length less than Maximum Segment Size (MSS)). The existence of such partial packets can result in boundary shifts for all successive packets.

The methods and systems provided can implement Boundary-shifting Resilience to deal with the problem of packet-level differences for the same content fetch. The methods and systems can utilize a unique identifier to identify and locate cache entries. The unique identifier has been disclosed herein thus far as applying to an entire data packet. However, data redundancy can exist at finer-than-packet levels. By way of example, a web page may have a few changes made every day. To take advantage of these finer-granularity redundancies, a segment-level algorithm can be used.

To effectively identify redundancies, an appropriate unit of data can be defined. Such units of data can be referred to as segments, which can be a sequence of bytes. Thus, a data stream can be split into segments. The data stream can be split using delimiters, which can decide the boundaries of segments. In an aspect, a fixed byte value delimiter can be used. For example, 0×20. Delimiters can be selected to address several concerns. In another aspect, delimiters can be identified based on Rabin Polynomials. Such an approach randomizes the occurrence pattern of delimiters by using a sequence of byte contents rather than a single byte value.

Figure 19:
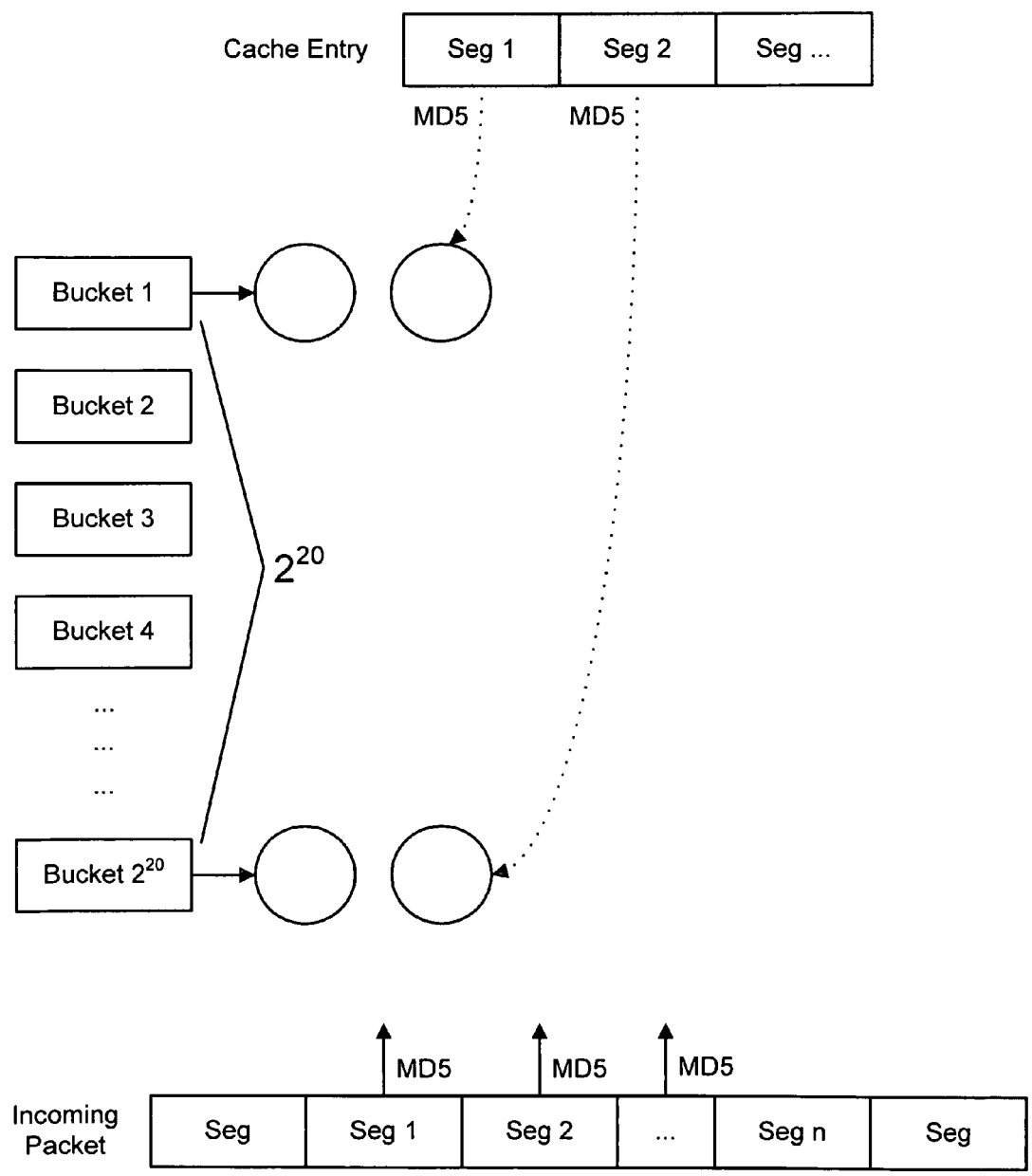
FIG. 19 is an exemplary segmentation method.

Segments can then be extracted, and placed into the caching space. When new packets arrive, they can be split into segments using the same delimiter, and the segments can be checked against the caching space to locate repeated byte sequences. If there is a cache hit, the corresponding cache entries can be recorded. (An exemplary process is shown in FIG. 19). The exact cache-hit bytes can be identified by comparing the packet data with the cache entry. The cache-hit information can be sent to the receiving entity where the actual data packet is recovered.

Figure 20:
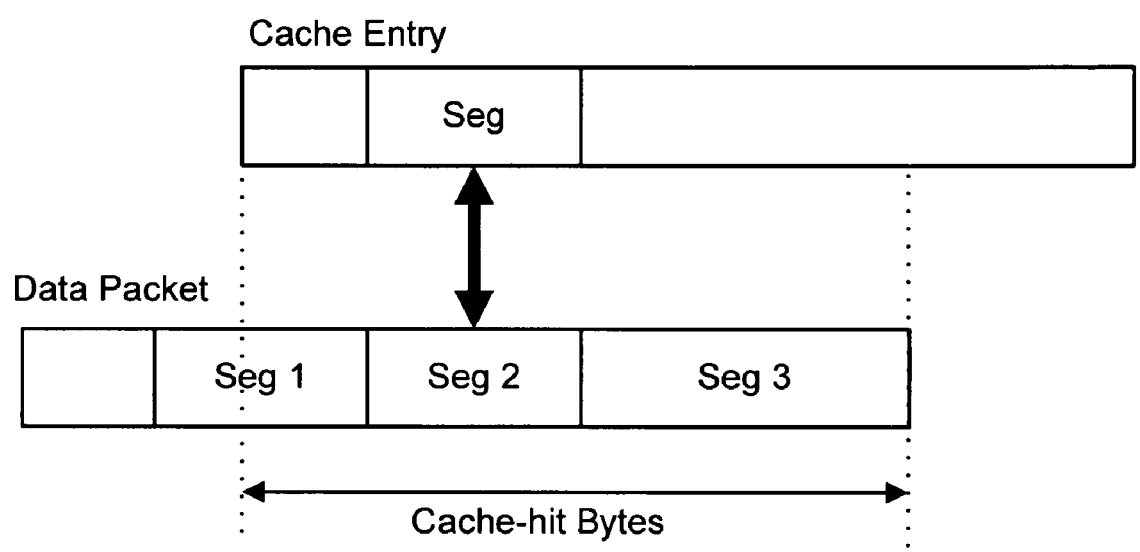
FIG. 20 is another exemplary segmentation method.

In an aspect, to further improve the segment-level cache lookup, whenever there is a segment-level cache-hit, the hit bytes can be extended to identify more cache-hit segments for the incoming packets. Specifically, for the incoming packet, starting from the cache-hit segment, segments before and after the hit can be further checked against the cache-hit entry in caching space, as shown in FIG. 20. If the incoming packet is similar to a cached packet, then more than one segment may be identified between them.

In an aspect, the caching space can store the hashes of both an entire packet and all the segments delimited from the packet. The packet hash can be checked first when performing a cache lookup, as it is desirable to have a full packet cache-hit. If it results in a cache-miss, then cache lookup for the segments can be performed.

In another aspect, the methods and systems provided account for minor changes in application data streams. These changes can occur at the beginning of a data stream, or at multiple places inside a data stream.

An example of the initial part of a data stream varying includes web fetching using the HTTP protocol. According to the HTTP protocol, application data may be preceded by HTTP header information of varying length. When such information exists, multiple runs which fetch the same object may occur in entirely different sequences of transmitted packets, i.e., no packets are exactly the same across different runs in terms of the raw data that they contain. Other reasons that may cause such scenarios include objects being mirrored on a different server and objects being named by a different URL.

The case of changes occurring at multiple places inside the data stream is a more generic case of variations in the initial part. In such scenarios, multiple places, instead of only the stream header, may be altered, and the data in between are not changed. An example of such a scenario includes a database file with only certain column of data is updated.

Figure 21:
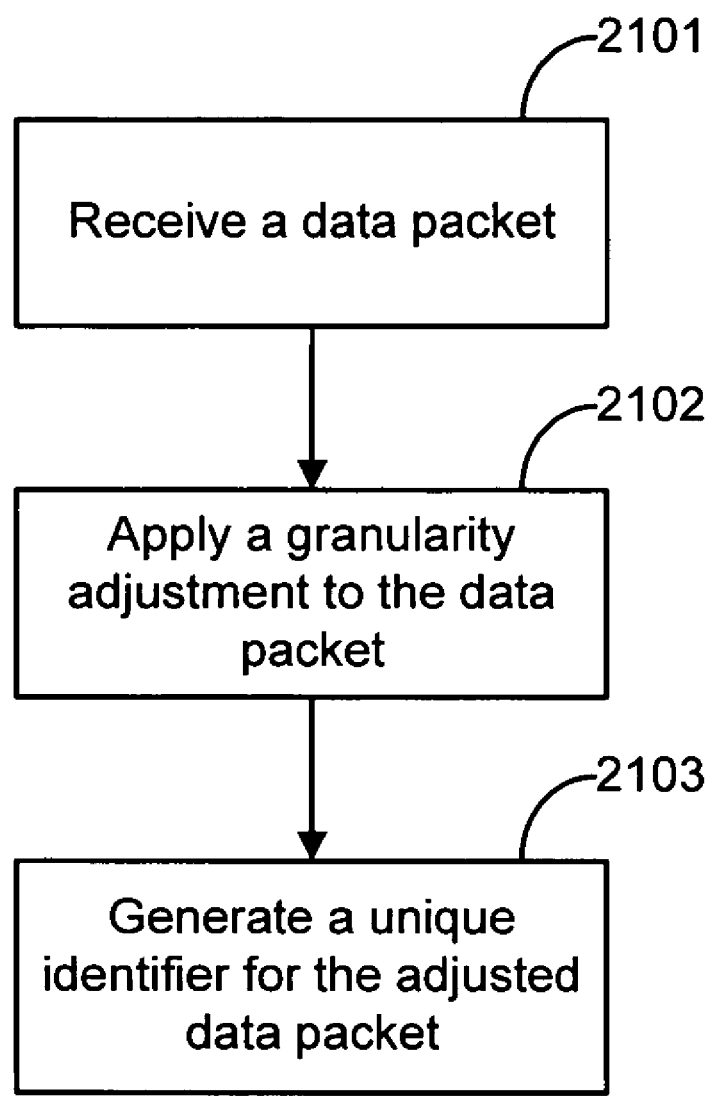
FIG. 21 is an exemplary method of operation.

In an aspect, illustrated in FIG. 21, provided are methods for data multi-caching, comprising receiving a data packet at 2101, applying a granularity adjustment to the data packet at 2102, and generating a unique identifier for the adjusted data packet at 2103, wherein the unique identifiers comprise a cryptographic hash and a prioritization factor. Applying a granularity adjustment to the data packet can comprise segmenting the data packet into a plurality of segments. Generating a unique identifier for the adjusted data packet can comprise generating a unique identifier for the data packet and for each of the plurality of segments. Segmenting the data packet into a plurality of segments can comprise dividing the data packet based on a Rabin polynomial. Applying a granularity adjustment to the data packet can comprise grouping the data packet into a plurality of data packets. Generating a unique identifier for the adjusted data packet can comprise generating a unique identifier for the data packet and for the plurality of data packets. The prioritization factor can comprise one or more of, bandwidth, frequency of access for a data pattern, importance of peer, and performance history.

When the same content at a granularity larger than a single packet needs to be sent through the same peer or to the same destination, the methods and systems provided can utilize a super caching technique where the granularity of data indexed by a hash can be more than a single packet. Thus a single hash sent to a peer (or destination) will result in the forwarding (or retrieval) of multiple data packets.

With super caching, packets can be organized into "streams," and a stream can comprise a sequence of packets that belong to the same host or connection. An example of a stream can simply be a connection, e.g. either TCP or UDP connections. For each stream, received packets can be buffered for improved performance, as long as the time constraints allow. Let the time constraint for a specific stream be a fixed value, denoted by Tc. Thus, for any packet belonging to a stream that has time constraint Tc, the maximum amount of time the packet can wait before transmission is Tc.

Figure 22:
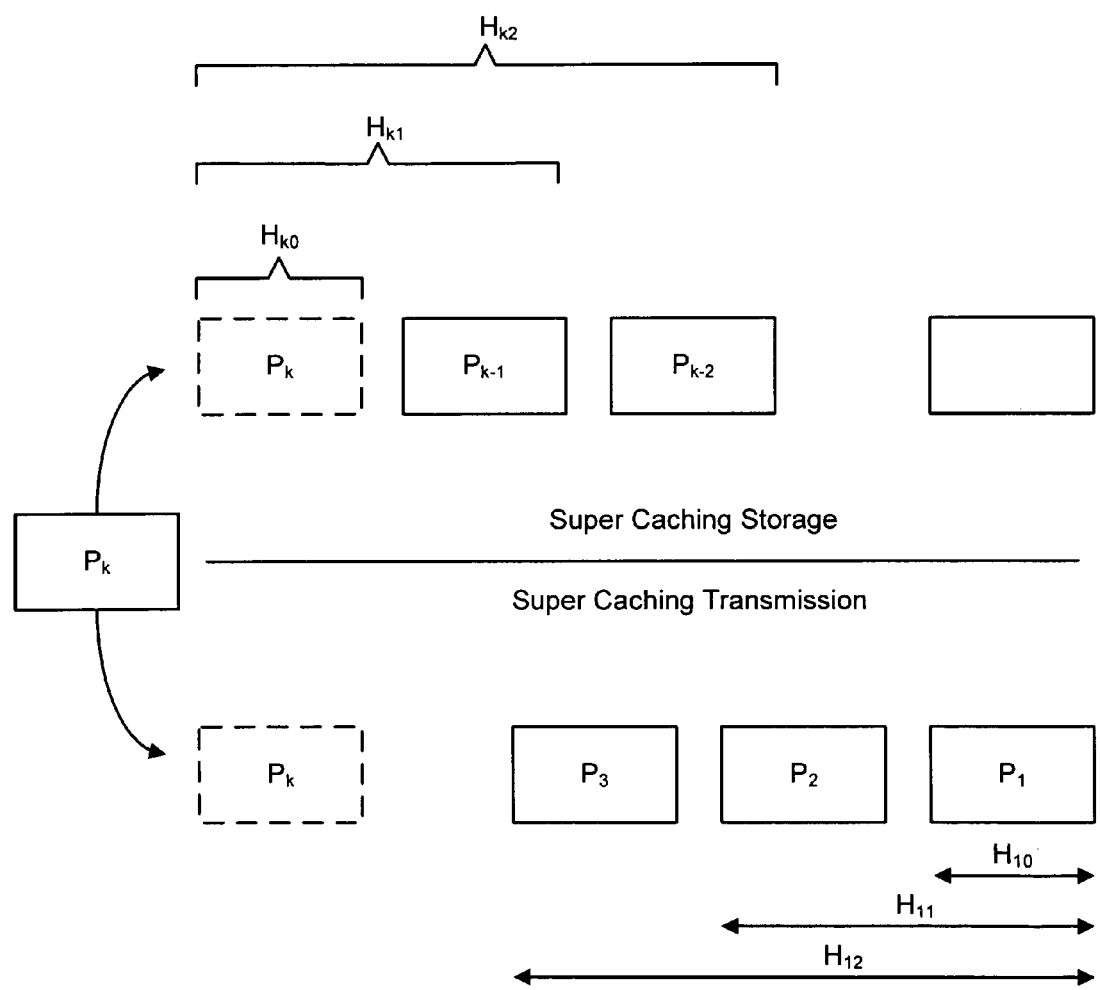
FIG. 22 is an exemplary super caching component.

The super caching component can comprise two mechanisms: Super Caching Storage (SCS), and Super Caching Transmission (SCT). SCS addresses caching space maintenance, while SCT determines the transmission of aggregated packets. For every incoming packet, a separate copy can be sent to these two mechanisms for parallel processing, as shown in FIG. 22.

In the Super Caching Storage mechanism, for each new packet Pk, a number of hash values can be obtained from Pk and the buffered packets. The maximum number of hash values can be K, which determines the maximum aggregation that can be performed by super-caching. Specifically, hash $H_{k0}$ can be computed from packet Pk. Hash $H_{k1}$ can be computed from packets Pk and Pk−1, and the combination of two packets can result in a new sequence of bytes (i.e, Pk−1 appended by Pk). This process can continue until all K hashes are computed.

In the Super Caching Transmission mechanism, each packet can be associated with a timer. The timer's expiration time can be Tc. When the timer expires, it looks for cache-hits by checking all available hashes it belongs to. These hashes are computed by the Super Caching Storage mechanism, and there are at most K hashes for each packet. When more than one cache-hit hashes exist, the packet can choose the hash that corresponds to the largest number of packets. For example, as shown in FIG. 22, when the timer of P1 expires, the methods and systems can check all hash values starting from $H_{10}$. If all three hashes shown in the figure result in cache-hit, then $H_{12}$ can be selected since it covers three packets.

If none of the hashes maintained by Super Caching results in a cache-hit, which implies that the packet-level caching failed to identify caches, the buffered packets can be handed to the segment-level caching (BSR) mechanisms described previously in to identify finer-granularity caches.

Also provided herein are apparatuses that can perform the methods disclosed in whole and/or in part. The apparatuses can comprise one or more of, a processor, a memory, and a network interface. Further provided herein are systems that can perform the methods disclosed herein. The systems can comprise one or more of a plurality of nodes in communication with each other. One or more of the nodes can serve as a GigaNode and one or more of the nodes can serve as a SoftNode.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for data multi-caching, comprising:
   receiving a unique identifier from a first node at a second node;
   determining data corresponding to the unique identifier;
   if the data corresponding to the unique identifier is present at the second node, transmitting the data to a third node; and
   if the data corresponding to the unique identifier is not present at the second node, transmitting a cache mismatch error to the first node.

2. The method of claim 1, wherein receiving a unique identifier from a first node comprises receiving a hash value.

3. The method of claim 1, wherein determining data corresponding to the unique identifier comprises searching a local cache at the second node.

4. The method of claim 1, wherein transmitting the data to a third node comprises transmitting the unique identifier.

5. The method of claim 1, further comprising:
   if the data corresponding to the unique identifier is present and the second node is the destination node, retrieving the data.

6. A method for data multi-caching, comprising:
   receiving a plurality of data packets;
   generating a plurality of first unique identifiers for one or more of the plurality of data packets, wherein one or more of the plurality of first unique identifiers comprises a cryptographic hash and a prioritization factor; and
   generating a second unique identifier for one or more of the plurality of first unique identifiers.

7. The method of claim 6, wherein generating a plurality of first unique identifier comprises generating a hash value.

8. The method of claim 7, wherein generating a hash value comprises the MD5 algorithm.

9. The method of claim 6, further comprising, transmitting a set of unique identifiers in a single data packet.

10. The method of claim 6, further comprising:
    receiving a third unique identifier for a second plurality of data packets; and
    determining if the third unique identifier matches the second unique identifier.

11. A method for data multi-caching, comprising:
    receiving a plurality of data packets;
    applying a granularity adjustment to the data packets;
    generating a plurality of first unique identifier for the adjusted data packets, wherein the plurality of first unique identifiers comprise one or more of a cryptographic hash and a prioritization factor; and
    generating a second unique identifier for one or more of the plurality of first unique identifiers.

12. The method of claim 11, wherein applying a granularity adjustment to the data packets comprises segmenting the data packets into a plurality of segments.

13. The method of claim 12, wherein segmenting the data packets into a plurality of segments comprises dividing the data packet based on a Rabin polynomial.

14. The method of claim 11, wherein the prioritization factor comprises one or more of, bandwidth, frequency of access for a data pattern, importance of peer, and performance history.

15. A method for multi-caching, comprising:
    determining an inconsistency between a first cache map on a first node and a second cache map on a second node;
    transmitting a first set of unique identifiers from the first cache map to the second node;
    comparing the first set of unique identifiers from the first cache map to a second set of unique identifiers from the second cache map;
    identifying one or more unique identifiers to be discarded from the first cache map; and
    transmitting the one or more unique identifiers to be discarded to the first node.

16. The method of claim 15, wherein the first cache map comprises data and unique identifiers associated with the data stored on the first node and the second cache map comprises data and unique identifiers associated with the data stored on the second node.

17. The method of claim 15, wherein determining an inconsistency between a first cache map on a first node and a second cache map on a second node comprises:
    generating a first unique identifier for a for a first cache map at a first node;
    transmitting the unique identifier to a second node;
    generating a second unique identifier for a second cache map at the second node; and
    comparing the first unique identifier and the second unique identifier to determine consistency of the first cache map and the second cache map.

* * * * *